UNITED STATES PATENT OFFICE.

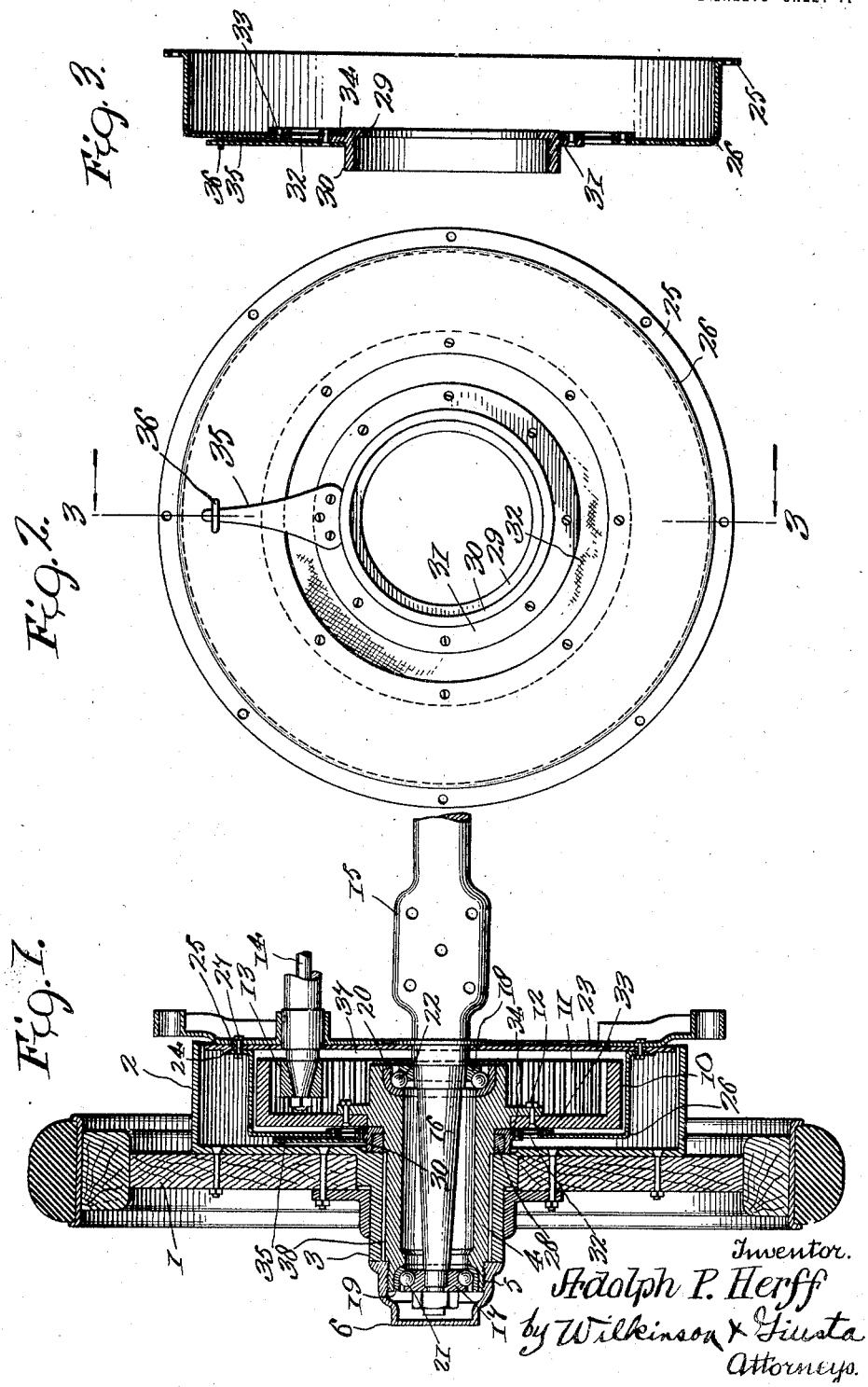

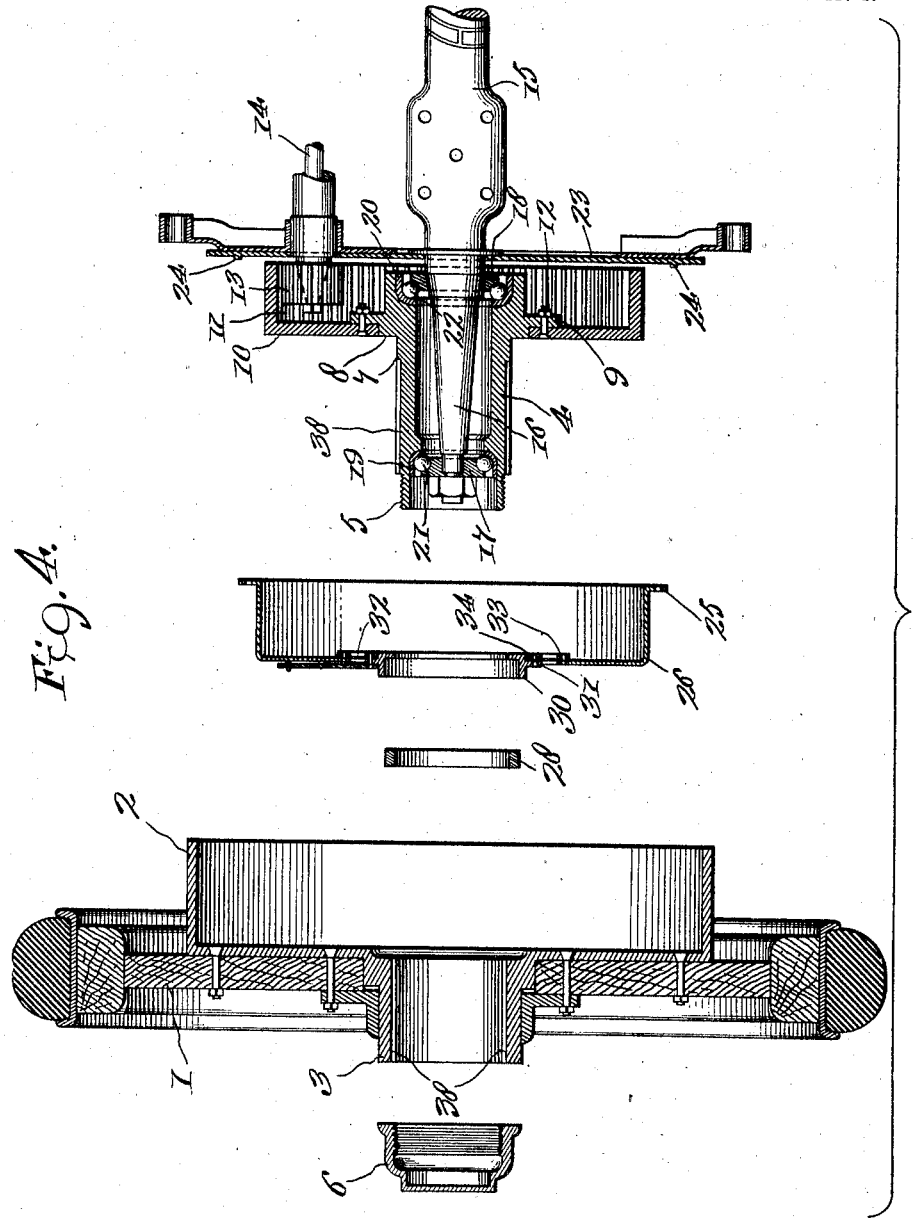

ADOLPH P. HERFF, OF SAN ANTONIO, TEXAS.

OIL-RETAINING INTERNAL-GEAR DRIVE.

1,305,103. Specification of Letters Patent. Patented May 27, 1919.

Application filed August 23, 1918. Serial No. 251,192.

*To all whom it may concern:*

Be it known that I, ADOLPH P. HERFF, a citizen of the United States, residing at San Antonio, in the county of Bexar and State of Texas, have invented certain new and useful Improvements in Oil-Retaining Internal-Gear Drives; and I do hereby declare the following to a be a full, clear, and exact description of the invention, such as will enable other skilled in the art to which it appertains to make and use the same.

The present invention relates to improvements in the means for retaining lubricant about drive mechanisms, and it is an object of the present invention to provide an internal or external gear drive for motor vehicles, traction engines or the like, in which all of the gears run constantly in a bath of oil.

The invention further has for its object to provide improved parts whereby the oil housing may be provided about the drive mechanism, with means to secure oil tight joints between the parts and to relieve the washer 28 shown in Figures 1 and 4 (in the accompanying drawings) of strain or liability to deform under slight eccentricity or wabbling caused by wear, improper adjustment of bearings and the like or any eccentricity caused by improper centering of the main hub and wheel on the axle spindle.

In the accompanying drawings forming a part of this application. and in which similar reference symbols indicate corresponding parts in the several views:

Fig. 1 is a vertical cross sectional view taken through the wheel and drive mechanism and showing the present invention applied thereto;

Fig. 2 is an enlarged front elevational view of a detail;

Fig. 3 is a vertical sectional view taken on the line 3—3 in Fig. 2; and

Fig. 4 shows a view similar to Fig. 1, with the parts separated and showing the order of assembly.

Referring now more particularly to the drawings, at 1 is designated a wheel such, for instance, as used on automobiles and 2 designates the usual brake drum carried by wheel 1.

The sleeve hub is shown at 3 and the main hub at 4, said sleeve hub 3 being adapted to fit over the main hub 4, in the manner shown in Fig. 1. In order to cause the sleeve hub 3 to be driven from the main hub 4, I preferably provide the adjacent faces of the two hubs with complemental grooves and ribs fitting into one another and shown at 38.

The main hub 4 is provided with the screw-threaded end 5 which is arranged to extend beyond the sleeve hub 3 when the parts are assembled so that this screw-threaded part 5 may receive the hub cap 6, which is also threaded to correspond and is used to securely hold sleeve hub 3 in its place.

The hub cap 6 will be so arranged as to be locked after screwing into place with some form of set screw or the like, overcoming thereby any tendency of the hub cap 6 to work loose during operation.

At 7 and 8 the main hub 4 is machined to present a smooth surface to the felt washer 28 and metal ring 30.

At 9 is shown a flange to receive the web 10 of the internal gear 11 and bolted together by bolts 12 which would be one way of many of fastening the internal gear to the main hub 4.

A drive pinion 13 as now used in this form of drive is shown in mesh with the standard or regular internal gear 11. Such pinion is shown on its shaft 14.

In the accompanying drawings the bearings of the wheel are shown as ball bearings, but these may be replaced with any suitable form of bearing without interfering with the spirit of the invention.

The axle of the vehicle is shown at 15 and the axle skein at 16. At 17 and 18 are shown cones which coöperate with corresponding cups 19 and 20 to form races for the ball bearings 21 and 22.

A substantially circular disk or plate 23 is provided with a substantially central opening to receive the axle 15 to which the plate is rigidly fastened so as not to be capable of revolving. The plate 23 has a suitable eccentric opening to receive the drive shaft 14 and its bearings.

This plate 23 is of the requisite size to form an inclosing head for the brake drum 2, as shown in Fig. 1 and, moreover, this plate 23 fulfils the further function of forming an inclosure for one side of the drive mechanism.

A circular shoulder 24 is provided on that side of the plate 23 next to the drive mechanism, and this shoulder is intended to receive the outer edge of an annular flange 25 carried by the housing 26. This housing may be of any suitable material, but it is preferably of pressed metal and given the cup-shape shown in the drawing.

The flange 25 fits up against the plate 23 and is bolted or otherwise secured thereto, as indicated by the fastening means at 27. The joint made at this point is such that it will be oil tight.

The housing 26 fits up against the opposite side of drive mechanism and also about the outer edge or periphery of said drive mechanism, and is adapted to coöperate with plate 23 to form an oil chamber in which a bath of oil will be maintained.

A felt or other washer 28 fits over the main hub 4, and is adapted to rest on a machined surface, as shown in Fig. 1.

This felt washer 28 is confined at one side by one end of the sleeve hub 3 and fits at its other end against the shoulder 29 formed on the ring 30 which surrounds the main hub 4; such shoulder 29 being arranged to fit close up against the machined surface 8. This ring 30 is preferably made of bearing bronze, although other material may be found desirable.

Before inserting felt washer 28 into the bronze ring 30 it may be preferable to place about said washer a flat split steel ring whose function it would be to cause washer 28 to contract, causing constant friction against machined surface 7 regardless of wear of the washer. This band is not shown in the accompanying drawing.

A flange 31 projects outwardly from the ring 30, and the outer edge of this flange 31 is separated from the adjacent inner peripheral edge of the housing 26 by a space which is inclosed by an oil resisting flexible membrane 32. This membrane is in the form of a ring and its opposite edges are clamped respectively to the housing 26 and flange 31 by clamp rings 33 and 34; rivets, or other suitable fastenings passing through the edges of the membrane, rings, and other parts, as shown.

In order that the ring 30 and washer 28 may take the motion of an eccentric strap about the axle spindle 16, I provide a torque lever 35, which in the instance shown is rigidly secured to the flange 31 of ring 30 and has its free end extending alongside the vertical portion of the housing 26.

The free end of the lever 35 is adapted to fit within a staple 36 or other suitable attachment carried by said horizontal part of the housing 26; the staple 36 being arranged in such a manner as to act as a guide to the free end of the lever 35 so that a reciprocal motion of the lever can take place through said staple while the ring 30 travels eccentrically about the axle spindle 16, as mentioned before.

No circumferential motion can be transmitted to the ring 30 and washer 28 through the revolving main hub 4 as such would be prevented by the lever 35 passing through the staple 36 which latter is fastened to the rigid and non-revolving housing 26.

In order that an oil-tight joint may be secured between the non-revolving and concentric housing 26 and the eccentrically moving yet non-revolving ring 30, I provide the membrane 32 which by its flexibility and ability to stretch will be able to adapt itself to the motion between the housing 26 and ring 30 while still remaining oil tight.

It is not to be inferred that the main hub 4 is intentionally caused to run eccentrically on the axle spindle 16 but that such is caused by wear and improper adjustment of wheel bearings.

From the above description it will become plain that the washer 28 and ring 30 become full floating upon the main hub 4, regardless of the center upon which the latter revolves.

In Fig. 4 the first assembly of the parts is indicated to the right, which consists of the main hub mounted upon its bearings with drive mechanism in place. Over this assembly is first slipped the housing 26 with its bronze ring 30 and membrane 32 in place, after which the flange 25 is securely bolted to the plate 23, making an oil-tight joint. The felt washer 28 with its accompanying compressing ring is next passed over the main hub 4 and fitted up tight against the shoulder 29 of the bronze ring 30. Thereafter the wheel is slipped over the main hub 4 with grooves and ribs 38 in mesh, and lastly the cap 6 is screwed on the end 5 and locked.

It is the intention that the housing described above shall be filled with oil or lubricant to such a level as to assure the best results.

The arrangement of the plate 23 is also such that it allows a passage 37 between it and the adjacent end of the main hub 4 and internal gear 11, through which the oil may find its way to the bearings of the wheels. The plate 23 also serves as a head for the open end of the brake drum 2 and excludes dust therefrom and the other internal parts carried therein.

In the accompanying drawings the lever 35 is shown as external of the oil housing, that is between the wheel 1 and housing 26, but this could be so arranged that said lever would be placed between the housing 26 and web 10 of the internal gear 11. This would place the lever within the oil space of the oil housing affording better lubrication between the lever 35 and staple 36 at their points of contact.

It is obvious that those skilled in the art may vary the details of construction and arrangement of parts without departing from the spirit of my invention, and therefore I do not wish to be limited to such features except as may be required by the claims.

Of course an external gear drive may be made to take the place of the internal gear shown, without modifying the invention here shown and described.

I claim:

1. In combination with a drive mechanism, of a plate inclosing one side of said mechanism, said plate having a shoulder thereon, a cup-shaped housing inclosing the opposite side of said drive mechanism, said housing also extending about the outer edge of the drive mechanism, the housing having a flange fitting against said plate and having its outer edge engaging against said shoulder, and fastening means passing through said flange and plate to hold the same tightly together and to provide a fluid-tight joint, substantially as described.

2. In combination with a vehicle wheel, a brake drum carried by said wheel, and drive mechanism for said wheel, of a plate forming a head for said brake drum and inclosing one side of said drive mechanism, a cup-shaped housing fitted about the opposite side and the external edge of said drive mechanism, said housing having a flange fitting against said plate, said plate and housing providing together an oil chamber for the drive mechanism, and means for securing said flange and said plate together to provide an oil-tight joint, substantially as described.

3. The combination with a wheel, a brake drum carried by said wheel, a sleeve hub also carried by said wheel, an axle, a main hub rotatably supported on said axle, said sleeve hub being adapted to be mounted on said main hub, means between said hubs for causing the same to rotate together, drive mechanism connected to rotate said main hub, a plate forming an inclosure for the open end of said brake drum and also acting to inclose one side of said drive mechanism, a substantially cup-shaped housing lying within said brake drum and inclosing the opposite side and the external edge of said drive mechanism, said housing and plate together forming an oil chamber for said drive mechanism, and means for providing a fluid-tight joint between said housing and plate, substantially as described.

4. The combination with a rotating hub, drive mechanism for rotating said hub, a plate inclosing one side of said drive mechanism and hub, a housing inclosing the other side and the external edge of said drive mechanism, said housing and plate being secured together, a non-rotatable ring on said hub, a flexible membrane connected between said ring and housing, and means connected between said housing and said ring for resisting rotation of the latter, substantially as described.

5. In combination with a rotating hub, and drive mechanism connected to rotate said hub, of a plate forming an inclosure for one side of said drive mechanism, a substantially cup-shaped housing inclosing the opposite side and the peripheral edge of said drive mechanism, said housing and plate being secured together to provide a fluid-tight joint, a non-rotatable ring on said hub and spaced from the adjacent part of said housing, an oil resisting membrane connected across the space between said ring and housing, said membrane being flexible and adapted to permit relative movement between said housing and ring, and means whereby said ring and housing are connected together but which permits of a relative eccentric movement of the ring, substantially as described.

6. In combination with an axle, of a rotating hub on said axle, a wheel mounted on said hub, drive mechanism for rotating said hub, a plate inclosing one side of said drive mechanism, a substantially cup-shaped housing inclosing the other side and the peripheral edge of said drive mechanism, said housing and plate having a joint therebetween, a non-rotatable ring on said hub, a flexible oil-proof membrane connected between said housing and ring, and a lever connected between said ring and housing for connecting the same together, said lever being arranged to permit a relative eccentric movement of said ring, substantially as described.

7. The combination with a rotating hub, and drive mechanism for rotating said hub, of a plate fitted up against and inclosing one side of said drive mechanism, a substantially cup-shaped housing fitted up against and inclosing the opposite side of said drive mechanism, a part of said housing extending about the peripheral edge of said drive mechanism and having a flange fitted against said plate, fastening means passing through the flange and plate, a non-rotatable ring on said hub, a flexible oil-tight membrane connected between said ring and housing, and a torque lever connected between said ring and housing, said lever being adapted to permit of relative eccentric movement of said ring, substantially as described.

8. The combination with a rotating hub, and drive mechanism for rotating said hub, of a plate fitted up against and inclosing one side of said drive mechanism, said plate having a shoulder, a substantially cup-shaped housing fitted up against and inclosing the opposite side of said drive mechanism, a portion of said housing fitting about and inclosing the peripheral edge of said drive mechanism, a flange on said housing lying against said plate, the outer edge of said flange engaging against said shoulder, fastening means passing through said flange and plate, a non-rotatable ring on said hub, there being a space between said ring and the adjacent part of said housing, a flexible oil-resisting membrane connected between said ring and the adjacent part of said housing, a lever connected to said ring extending alongside said housing, and means carried by said housing for embracing said lever and adapted to allow an eccentric movement of the ring with respect to the housing, substantially as described.

ADOLPH P. HERFF.